United States Patent
Endresen

(10) Patent No.: US 9,407,933 B2
(45) Date of Patent: Aug. 2, 2016

(54) SIMULTANEOUS AND LOOPLESS VECTOR CALCULATION OF ALL RUN-LEVEL PAIRS IN VIDEO COMPRESSION

(71) Applicant: Pexip AS

(72) Inventor: Lars Petter Endresen, Nesoddtangen (NO)

(73) Assignee: Pexip AS, Lysaker (NO)

( * ) Notice: Subject to any disclaimer, the term of this patent is extended or adjusted under 35 U.S.C. 154(b) by 526 days.

(21) Appl. No.: 13/968,719

(22) Filed: Aug. 16, 2013

(65) Prior Publication Data
US 2014/0185687 A1      Jul. 3, 2014

Related U.S. Application Data

(60) Provisional application No. 61/746,703, filed on Dec. 28, 2012.

(30) Foreign Application Priority Data

Dec. 27, 2012 (NO) .................................... 20121570

(51) Int. Cl.
*H04N 19/60* (2014.01)
*H04N 19/436* (2014.01)
(Continued)

(52) U.S. Cl.
CPC ............. *H04N 19/60* (2014.11); *H04N 19/436* (2014.11); *H04N 19/91* (2014.11); *H04N 19/93* (2014.11)

(58) Field of Classification Search
USPC .................................................. 375/240.18
See application file for complete search history.

(56) References Cited

U.S. PATENT DOCUMENTS 6,529,554 B1 * 3/2003 Craver ................. H04N 19/176
348/423.1
6,985,529 B1 * 1/2006 Klivington ............. H04N 19/60
375/240.2
(Continued)

FOREIGN PATENT DOCUMENTS

| NO | 330107 B1 | 1/2011 |
| WO | 2009031904 A2 | 3/2009 |
| WO | 2010077148 A1 | 7/2010 |
| WO | 2012015312 A1 | 2/2012 |

OTHER PUBLICATIONS

Minallah et al., Near-Capacity H.264 Multimedia Communications Using Iterative Joint Source-Channel Decoding, IEEE Communications Surveys & Tutorials, Accepted for Publication.
(Continued)

*Primary Examiner* — Dave Czekaj
*Assistant Examiner* — Shanika Brumfield
(74) *Attorney, Agent, or Firm* — Christopher & Weisberg, P.A.

(57) ABSTRACT

A method and a decoding or coding device for calculating at least one of run and level representations of respective quantized transform coefficients representing pixel values in a block of a video picture inserted in a coefficient array is disclosed. The method and the decoding or coding device are adjusted to generate a bitmask of the quantized transform coefficients, respectively perform a look up of the 8 least significant bits and the 8 most significant bits of the bitmask in a look up table, patch the looked up lower part and upper part bytemap values and insert the bytes of the first bytemap array from index position 8 minus the number of non-zeros in the 8 least significant bits of the bitmask.

10 Claims, 9 Drawing Sheets

(51) Int. Cl.
*H04N 19/91* (2014.01)
*H04N 19/93* (2014.01)

(56) References Cited

U.S. PATENT DOCUMENTS

2003/0190085 A1* 10/2003 Lin .................. G06F 17/147
382/250
2010/0166076 A1* 7/2010 Endresen ............. H04N 19/176
375/240.18

OTHER PUBLICATIONS

Norwegian Search Report dated Jul. 3, 2013 for National Application No. 20121570, International Filing Date: Dec. 27, 2012 consisting of 2-pages.
International-Type Search Report dated Aug. 22, 2013 for National Application No. 20121570, International Filing Date: Dec. 27, 2012 consisting of 5-pages.

* cited by examiner

```
{0xffffffffffffffff,0xffffffffffffffff}, //  0
{0xffffffffffffff00,0x08ffffffffffffff}, //  1
{0xffffffffffffff01,0x09ffffffffffffff}, //  2
{0xffffffffffff0001,0x0809ffffffffffff}, //  3
{0xffffffffffffff02,0x0affffffffffffff}, //  4
{0xffffffffffff0002,0x080affffffffffff}, //  5
{0xffffffffffff0102,0x090affffffffffff}, //  6
{0xffffffffff000102,0x08090affffffffff}, //  7
{0xffffffffffffff03,0x0bffffffffffffff}, //  8
{0xffffffffffff0003,0x080bffffffffffff}, //  9
{0xffffffffffff0103,0x090bffffffffffff}, // 10
{0xffffffffff000103,0x08090bffffffffff}, // 11
{0xffffffffffff0203,0x0a0bffffffffffff}, // 12
{0xffffffffff000203,0x080a0bffffffffff}, // 13
{0xffffffffff010203,0x090a0bffffffffff}, // 14
{0xffffffff00010203,0x08090a0bffffffff}, // 15
{0xffffffffffffff04,0x0cffffffffffffff}, // 16
{0xffffffffffff0004,0x080cffffffffffff}, // 17
{0xffffffffffff0104,0x090cffffffffffff}, // 18
{0xffffffffff000104,0x08090cffffffffff}, // 19
{0xffffffffffff0204,0x0a0cffffffffffff}, // 20
{0xffffffffff000204,0x080a0cffffffffff}, // 21
{0xffffffffff010204,0x090a0cffffffffff}, // 22
{0xffffffff00010204,0x08090a0cffffffff}, // 23
{0xffffffffffff0304,0x0b0cffffffffffff}, // 24
{0xffffffffff000304,0x080b0cffffffffff}, // 25
{0xffffffffff010304,0x090b0cffffffffff}, // 26
{0xffffffff00010304,0x08090b0cffffffff}, // 27
{0xffffffffff020304,0x0a0b0cffffffffff}, // 28
{0xffffffff00020304,0x080a0b0cffffffff}, // 29
{0xffffffff01020304,0x090a0b0cffffffff}, // 30
{0xffffff0001020304,0x08090a0b0cffffff}, // 31
{0xffffffffffffff05,0x0dffffffffffffff}, // 32
{0xffffffffffff0005,0x080dffffffffffff}, // 33
{0xffffffffffff0105,0x090dffffffffffff}, // 34
{0xffffffffff000105,0x08090dffffffffff}, // 35
{0xffffffffffff0205,0x0a0dffffffffffff}, // 36
{0xffffffffff000205,0x080a0dffffffffff}, // 37
{0xffffffffff010205,0x090a0dffffffffff}, // 38
{0xffffffff00010205,0x08090a0dffffffff}, // 39
{0xffffffffffff0305,0x0b0dffffffffffff}, // 40
{0xffffffffff000305,0x080b0dffffffffff}, // 41
{0xffffffffff010305,0x090b0dffffffffff}, // 42
{0xffffffff00010305,0x08090b0dffffffff}, // 43
```

Figure 4A

```
{0xffffffffff020305,0x0a0b0dffffffffff}, // 44
{0xffffffff00020305,0x080a0b0dffffffff}, // 45
{0xffffffff01020305,0x090a0b0dffffffff}, // 46
{0xffffff0001020305,0x08090a0b0dffffff}, // 47
{0xffffffffffff0405,0x0c0dffffffffffff}, // 48
{0xffffffffff000405,0x080c0dffffffffff}, // 49
{0xffffffffff010405,0x090c0dffffffffff}, // 50
{0xffffffff00010405,0x08090c0dffffffff}, // 51
{0xffffffffff020405,0x0a0c0dffffffffff}, // 52
{0xffffffff00020405,0x080a0c0dffffffff}, // 53
{0xffffffff01020405,0x090a0c0dffffffff}, // 54
{0xffffff0001020405,0x08090a0c0dffffff}, // 55
{0xffffffffff030405,0x0b0c0dffffffffff}, // 56
{0xffffffff00030405,0x080b0c0dffffffff}, // 57
{0xffffffff01030405,0x090b0c0dffffffff}, // 58
{0xffffff0001030405,0x08090b0c0dffffff}, // 59
{0xffffffff02030405,0x0a0b0c0dffffffff}, // 60
{0xffffff0002030405,0x080a0b0c0dffffff}, // 61
{0xffffff0102030405,0x090a0b0c0dffffff}, // 62
{0xffff000102030405,0x08090a0b0c0dffff}, // 63
{0xffffffffffffff06,0x0effffffffffffff}, // 64
{0xffffffffffff0006,0x080effffffffffff}, // 65
{0xffffffffffff0106,0x090effffffffffff}, // 66
{0xffffffffff000106,0x08090effffffffff}, // 67
{0xffffffffffff0206,0x0a0effffffffffff}, // 68
{0xffffffffff000206,0x080a0effffffffff}, // 69
{0xffffffffff010206,0x090a0effffffffff}, // 70
{0xffffffff00010206,0x08090a0effffffff}, // 71
{0xffffffffffff0306,0x0b0effffffffffff}, // 72
{0xffffffffff000306,0x080b0effffffffff}, // 73
{0xffffffffff010306,0x090b0effffffffff}, // 74
{0xffffffff00010306,0x08090b0effffffff}, // 75
{0xffffffffff020306,0x0a0b0effffffffff}, // 76
{0xffffffff00020306,0x080a0b0effffffff}, // 77
{0xffffffff01020306,0x090a0b0effffffff}, // 78
{0xffffff0001020306,0x08090a0b0effffff}, // 79
{0xffffffffffff0406,0x0c0effffffffffff}, // 80
{0xffffffffff000406,0x080c0effffffffff}, // 81
{0xffffffffff010406,0x090c0effffffffff}, // 82
{0xffffffff00010406,0x08090c0effffffff}, // 83
{0xffffffffff020406,0x0a0c0effffffffff}, // 84
{0xffffffff00020406,0x080a0c0effffffff}, // 85
{0xffffffff01020406,0x090a0c0effffffff}, // 86
{0xffffff0001020406,0x08090a0c0effffff}, // 87
{0xffffffffff030406,0x0b0c0effffffffff}, // 88
```

Figure 4B

```
{0xffffffff00030406,0x080b0c0effffffff}, //  89
{0xffffffff01030406,0x090b0c0effffffff}, //  90
{0xffffff0001030406,0x08090b0c0effffff}, //  91
{0xffffffff02030406,0x0a0b0c0effffffff}, //  92
{0xffffff0002030406,0x080a0b0c0effffff}, //  93
{0xffffff0102030406,0x090a0b0c0effffff}, //  94
{0xffff000102030406,0x08090a0b0c0effff}, //  95
{0xffffffffffff0506,0x0d0effffffffffff}, //  96
{0xffffffffff000506,0x080d0effffffffff}, //  97
{0xffffffffff010506,0x090d0effffffffff}, //  98
{0xffffffff00010506,0x08090d0effffffff}, //  99
{0xffffffffff020506,0x0a0d0effffffffff}, // 100
{0xffffffff00020506,0x080a0d0effffffff}, // 101
{0xffffffff01020506,0x090a0d0effffffff}, // 102
{0xffffff0001020506,0x08090a0d0effffff}, // 103
{0xffffffffff030506,0x0b0d0effffffffff}, // 104
{0xffffffff00030506,0x080b0d0effffffff}, // 105
{0xffffffff01030506,0x090b0d0effffffff}, // 106
{0xffffff0001030506,0x08090b0d0effffff}, // 107
{0xffffffff02030506,0x0a0b0d0effffffff}, // 108
{0xffffff0002030506,0x080a0b0d0effffff}, // 109
{0xffffff0102030506,0x090a0b0d0effffff}, // 110
{0xffff000102030506,0x08090a0b0d0effff}, // 111
{0xffffffffff040506,0x0c0d0effffffffff}, // 112
{0xffffffff00040506,0x080c0d0effffffff}, // 113
{0xffffffff01040506,0x090c0d0effffffff}, // 114
{0xffffff0001040506,0x08090c0d0effffff}, // 115
{0xffffffff02040506,0x0a0c0d0effffffff}, // 116
{0xffffff0002040506,0x080a0c0d0effffff}, // 117
{0xffffff0102040506,0x090a0c0d0effffff}, // 118
{0xffff000102040506,0x08090a0c0d0effff}, // 119
{0xffffffff03040506,0x0b0c0d0effffffff}, // 120
{0xffffff0003040506,0x080b0c0d0effffff}, // 121
{0xffffff0103040506,0x090b0c0d0effffff}, // 122
{0xffff000103040506,0x08090b0c0d0effff}, // 123
{0xffffff0203040506,0x0a0b0c0d0effffff}, // 124
{0xffff000203040506,0x080a0b0c0d0effff}, // 125
{0xffff010203040506,0x090a0b0c0d0effff}, // 126
{0xff00010203040506,0x08090a0b0c0d0eff}, // 127
{0xffffffffffffff07,0x0fffffffffffffff}, // 128
{0xffffffffffff0007,0x080fffffffffffff}, // 129
{0xffffffffffff0107,0x090fffffffffffff}, // 130
```

Figure 4C

```
{0xffffffffff000107,0x08090fffffffffff}, // 131
{0xfffffffffffff0207,0x0a0fffffffffffff}, // 132
{0xffffffffff000207,0x080a0fffffffffff}, // 133
{0xffffffffff010207,0x090a0fffffffffff}, // 134
{0xffffffff00010207,0x08090a0fffffffff}, // 135
{0xfffffffffffff0307,0x0b0fffffffffffff}, // 136
{0xffffffffff000307,0x080b0fffffffffff}, // 137
{0xffffffffff010307,0x090b0fffffffffff}, // 138
{0xffffffff00010307,0x08090b0fffffffff}, // 139
{0xffffffffff020307,0x0a0b0fffffffffff}, // 140
{0xffffffff00020307,0x080a0b0fffffffff}, // 141
{0xffffffff01020307,0x090a0b0fffffffff}, // 142
{0xffffff0001020307,0x08090a0b0fffffff}, // 143
{0xfffffffffffff0407,0x0c0fffffffffffff}, // 144
{0xffffffffff000407,0x080c0fffffffffff}, // 145
{0xffffffffff010407,0x090c0fffffffffff}, // 146
{0xffffffff00010407,0x08090c0fffffffff}, // 147
{0xffffffffff020407,0x0a0c0fffffffffff}, // 148
{0xffffffff00020407,0x080a0c0fffffffff}, // 149
{0xffffffff01020407,0x090a0c0fffffffff}, // 150
{0xffffff0001020407,0x08090a0c0fffffff}, // 151
{0xffffffffff030407,0x0b0c0fffffffffff}, // 152
{0xffffffff00030407,0x080b0c0fffffffff}, // 153
{0xffffffff01030407,0x090b0c0fffffffff}, // 154
{0xffffff0001030407,0x08090b0c0fffffff}, // 155
{0xffffffff02030407,0x0a0b0c0fffffffff}, // 156
{0xffffff0002030407,0x080a0b0c0fffffff}, // 157
{0xffffff0102030407,0x090a0b0c0fffffff}, // 158
{0xffff000102030407,0x08090a0b0c0fffff}, // 159
{0xfffffffffffff0507,0x0d0fffffffffffff}, // 160
{0xffffffffff000507,0x080d0fffffffffff}, // 161
{0xffffffffff010507,0x090d0fffffffffff}, // 162
{0xffffffff00010507,0x08090d0fffffffff}, // 163
{0xffffffffff020507,0x0a0d0fffffffffff}, // 164
{0xffffffff00020507,0x080a0d0fffffffff}, // 165
{0xffffffff01020507,0x090a0d0fffffffff}, // 166
{0xffffff0001020507,0x08090a0d0fffffff}, // 167
{0xffffffffff030507,0x0b0d0fffffffffff}, // 168
{0xffffffff00030507,0x080b0d0fffffffff}, // 169
{0xffffffff01030507,0x090b0d0fffffffff}, // 170
{0xffffff0001030507,0x08090b0d0fffffff}, // 171
{0xffffffff02030507,0x0a0b0d0fffffffff}, // 172
{0xffffff0002030507,0x080a0b0d0fffffff}, // 173
{0xffffff0102030507,0x090a0b0d0fffffff}, // 174
{0xffff000102030507,0x08090a0b0d0fffff}, // 175
{0xffffffffff040507,0x0c0d0fffffffffff}, // 176
```

Figure 4D

```
{0xffffffff00040507,0x080c0d0fffffffff}, // 177
{0xffffffff01040507,0x090c0d0fffffffff}, // 178
{0xffffff0001040507,0x08090c0d0fffffff}, // 179
{0xffffffff02040507,0x0a0c0d0fffffffff}, // 180
{0xffffff0002040507,0x080a0c0d0fffffff}, // 181
{0xffffff0102040507,0x090a0c0d0fffffff}, // 182
{0xffff000102040507,0x08090a0c0d0fffff}, // 183
{0xffffffff03040507,0x0b0c0d0fffffffff}, // 184
{0xffffff0003040507,0x080b0c0d0fffffff}, // 185
{0xffffff0103040507,0x090b0c0d0fffffff}, // 186
{0xffff000103040507,0x08090b0c0d0fffff}, // 187
{0xffffff0203040507,0x0a0b0c0d0fffffff}, // 188
{0xffff000203040507,0x080a0b0c0d0fffff}, // 189
{0xffff010203040507,0x090a0b0c0d0fffff}, // 190
{0xff00010203040507,0x08090a0b0c0d0fff}, // 191
{0xffffffffffff0607,0x0e0fffffffffffff}, // 192
{0xffffffffff000607,0x080e0fffffffffff}, // 193
{0xffffffffff010607,0x090e0fffffffffff}, // 194
{0xffffffff00010607,0x08090e0fffffffff}, // 195
{0xffffffffff020607,0x0a0e0fffffffffff}, // 196
{0xffffffff00020607,0x080a0e0fffffffff}, // 197
{0xffffffff01020607,0x090a0e0fffffffff}, // 198
{0xffffff0001020607,0x08090a0e0fffffff}, // 199
{0xffffffffff030607,0x0b0e0fffffffffff}, // 200
{0xffffffff00030607,0x080b0e0fffffffff}, // 201
{0xffffffff01030607,0x090b0e0fffffffff}, // 202
{0xffffff0001030607,0x08090b0e0fffffff}, // 203
{0xffffffff02030607,0x0a0b0e0fffffffff}, // 204
{0xffffff0002030607,0x080a0b0e0fffffff}, // 205
{0xffffff0102030607,0x090a0b0e0fffffff}, // 206
{0xffff000102030607,0x08090a0b0e0fffff}, // 207
{0xffffffffff040607,0x0c0e0fffffffffff}, // 208
{0xffffffff00040607,0x080c0e0fffffffff}, // 209
{0xffffffff01040607,0x090c0e0fffffffff}, // 210
{0xffffff0001040607,0x08090c0e0fffffff}, // 211
{0xffffffff02040607,0x0a0c0e0fffffffff}, // 212
{0xffffff0002040607,0x080a0c0e0fffffff}, // 213
{0xffffff0102040607,0x090a0c0e0fffffff}, // 214
{0xffff000102040607,0x08090a0c0e0fffff}, // 215
{0xffffffff03040607,0x0b0c0e0fffffffff}, // 216
{0xffffff0003040607,0x080b0c0e0fffffff}, // 217
{0xffffff0103040607,0x090b0c0e0fffffff}, // 218
{0xffff000103040607,0x08090b0c0e0fffff}, // 219
{0xffffff0203040607,0x0a0b0c0e0fffffff}, // 220
```

Figure 4E

```
{0xffff000203040607,0x080a0b0c0e0fffff}, // 221
{0xffff010203040607,0x090a0b0c0e0fffff}, // 222
{0xff00010203040607,0x08090a0b0c0e0fff}, // 223
{0xffffffffff050607,0x0d0e0fffffffffff}, // 224
{0xffffffff00050607,0x080d0e0fffffffff}, // 225
{0xffffffff01050607,0x090d0e0fffffffff}, // 226
{0xffffff0001050607,0x08090d0e0fffffff}, // 227
{0xffffffff02050607,0x0a0d0e0fffffffff}, // 228
{0xffffff0002050607,0x080a0d0e0fffffff}, // 229
{0xffffff0102050607,0x090a0d0e0fffffff}, // 230
{0xffff000102050607,0x08090a0d0e0fffff}, // 231
{0xffffffff03050607,0x0b0d0e0fffffffff}, // 232
{0xffffff0003050607,0x080b0d0e0fffffff}, // 233
{0xffffff0103050607,0x090b0d0e0fffffff}, // 234
{0xffff000103050607,0x08090b0d0e0fffff}, // 235
{0xffffff0203050607,0x0a0b0d0e0fffffff}, // 236
{0xffff000203050607,0x080a0b0d0e0fffff}, // 237
{0xffff010203050607,0x090a0b0d0e0fffff}, // 238
{0xff00010203050607,0x08090a0b0d0e0fff}, // 239
{0xffffffff04050607,0x0c0d0e0fffffffff}, // 240
{0xffffff0004050607,0x080c0d0e0fffffff}, // 241
{0xffffff0104050607,0x090c0d0e0fffffff}, // 242
{0xffff000104050607,0x08090c0d0e0fffff}, // 243
{0xffffff0204050607,0x0a0c0d0e0fffffff}, // 244
{0xffff000204050607,0x080a0c0d0e0fffff}, // 245
{0xffff010204050607,0x090a0c0d0e0fffff}, // 246
{0xff00010204050607,0x08090a0c0d0e0fff}, // 247
{0xffffff0304050607,0x0b0c0d0e0fffffff}, // 248
{0xffff000304050607,0x080b0c0d0e0fffff}, // 249
{0xffff010304050607,0x090b0c0d0e0fffff}, // 250
{0xff00010304050607,0x08090b0c0d0e0fff}, // 251
{0xffff020304050607,0x0a0b0c0d0e0fffff}, // 252
{0xff00020304050607,0x080a0b0c0d0e0fff}, // 253
{0xff01020304050607,0x090a0b0c0d0e0fff}, // 254
{0x0001020304050607,0x08090a0b0c0d0e0f}, // 255
```

Figure 4F

SIMULTANEOUS AND LOOPLESS VECTOR CALCULATION OF ALL RUN-LEVEL PAIRS IN VIDEO COMPRESSION

CROSS-REFERENCE TO RELATED APPLICATION

This application is related to and claims priority to U.S. Provisional Patent Application No. 61/746,703, filed Dec. 28, 2012, entitled SIMULTANEOUS AND LOOPLESS VECTOR CALCULATION OF ALL RUN-LEVEL PAIRS IN VIDEO COMPRESSION, and is related to and claims priority to Norwegian Patent Application No. 20121570, the entirety of both of which are incorporated herein by reference.

FIELD OF THE INVENTION

The present disclosure relates to an implementation of entropy coding/decoding of transform coefficient data of video compression systems in computer devices or systems.

BACKGROUND OF THE INVENTION

Transmission of moving pictures in real time is employed in several applications such as, but not limited to, video conferencing, net meetings, television (TV) broadcasting, and video telephony. Representing moving pictures requires bulk information as digital video typically is described by representing each pixel in a picture with 8 bits, which is equal to 1 byte. Such uncompressed video data results in large bit volumes, and cannot be transferred over conventional communication networks and transmission lines in real time due to limited bandwidth.

Thus, enabling real time video transmission requires a large extent of data compression. Data compression may, however, compromise the picture quality. Therefore, great efforts have been made to develop compression techniques allowing real time transmission of high quality video over bandwidth limited data connections. In video compression systems, the main goal is to represent the video information with as little capacity as possible. Capacity is defined with bits, either as a constant value or as bits/time unit. In both cases, the goal is to reduce the number of bits. A conventional video coding method is described in the Moving Picture Experts Group (MPEG) and H.26 standards. The video data undergoes four main processes before transmission (i.e., the prediction process, the transformation process, the quantization process, and the entropy coding).

The prediction process reduces the amount of bits required for each picture in a video sequence to be transferred. The process takes advantage of the similarity of parts of the sequence with other parts of the sequence. Since the predictor part is known to both encoder and decoder, only the difference has to be transferred. This difference typically requires much less capacity for its representation. The prediction is mainly based on vectors representing movements. The prediction process is conventionally performed on square block sizes (e.g., 16×16 pixels). Note that in some cases, predictions of pixels based on adjacent pixels in the same picture, rather than pixels of preceding pictures, are used. This is referred to as intra prediction (not to be confused with inter prediction). The residual represented as a block of data (e.g., 4×4 pixels) still contains internal correlation. A conventional method which takes advantage of this and performs a two-dimensional block transform. In H.263, an 8×8 Discrete Cosine Transform (DCT) is used, whereas in H.264, a 4×4 integer-type transform is used. This transforms 4×4 pixels into 4×4 transform coefficients which can usually be represented by fewer0 bits than the pixel representation. Transform of a 4×4 array of pixels with internal correlation may result in a 4×4 block of transform coefficients with much fewer nonzero values than the original 4×4 pixel block.

Direct representation of the transform coefficients is too costly for many applications. A quantization process is carried out for a further reduction of the data representation. Hence, the transform coefficients undergo quantization. One way of quantization is to divide parameter values by a number, which results in a smaller number that may be represented by fewer bits. This quantization process results in the reconstructed video sequence being somewhat different from the uncompressed sequence. This phenomenon is referred to as "lossy coding." The outcome from the quantization part is referred to as quantized transform coefficients.

Entropy coding is a special form of lossless data compression. Entropy coding involves arranging the image components in a "zigzag" order employing a run-length encoding (RLE) algorithm that groups similar frequencies together, inserting length coding zeros, and then using Huffman coding on what is left.

In H.264 encoding, the DCT coefficients for a block are reordered in order to group together non-zero coefficients in an array, enabling efficient representation of the remaining zero-valued coefficients. FIG. 1 shows the zigzag reordering path (i.e., scan order). The pattern of the order of the zigzag scan is configured according to the probability of non-zero coefficients in each positions. Due to the characteristics of the preceding DCT, the probability of non-zero coefficients in a block decreases in the downward right diagonal direction of a DCT block. When reordering the coefficients in a zigzag pattern, as illustrated in FIG. 1, the non-zero coefficients generally tend to concentrate in the first positions of the array.

The output of the reordering process includes a one-dimensional array that contains one or more clusters of non-zero coefficients near the start, followed by strings of zero coefficients. Due to the large number of zero values, the array is further represented as a series of (run, level) pairs, where "run" indicates the number of zeros preceding a non-zero coefficient, and "level" indicates the magnitude of the non-zero coefficient. As an example, the input array 7, −3, 0, 0, 0, 0, 3, −1, 2, −1, 0, 0, 0, 1, 0, 1 will have the following corresponding run-level values: (0,7), (0,−3), (4,3), (0,−1), (0,2), (0,−1), (3,1) (1,1). When transforming the zigzag array to run-level values, it is computationally expensive to loop over all coefficients and check whether they are non-zero.

Video encoding for HD formats increases the demands for memory and data processing, and requires efficient and high bandwidth memory organizations coupled with compute intensive capabilities. Due to these multiple demands, a flexible parallel processing approach must be found to meet the demands in a cost effective manner.

Video codecs are typically installed on customized hardware in video endpoints with DSP based processors. However, it has recently become more common to install video codecs in general purpose processors with a SIMD processor environment.

Therefore, there is a need for a time and processor efficient run/level or CAVLC (Context Aware Variable Length Coding) method taking advantage of the nature of the general purpose processors in a SIMD processor environment with no loops and without compromising with data quality.

SUMMARY OF THE INVENTION

The embodiments herein discloses a method in a video coding or decoding process performed in a computer device for calculating run and/or level representations of respective quantized transform coefficients representing pixel values in a block of a video picture inserted in a coefficient array, comprising the steps of generating a bitmask array inserting "1" in corresponding positions of nonzero coefficients in the coefficient array and "0" in corresponding positions of zero coefficients in the coefficient array, respectively performing a look up of the 8 least significant bits and the 8 most significant bits of the bitmask in a look up table mapping all possible 8 bits bitmap values to corresponding lower part and upper part bytemap values, patching the looked up lower part and upper part bytemap values in a first bytemap array, and inserting the bytes of the first bytemap array from index position 8 minus the number of non-zeros in the 8 least significant bits of the bitmask in a second bytemap array.

In some embodiments, the method also comprises a step of determining the level representation by reading consecutive bytes from the coefficient arrays being indexed by values of the second bytemap array.

In some embodiments, the method also comprises the steps of creating a copy of the second bytemap array in a third bytemap array, adding +1 to each value of the third bytemap array, shifting the values of the third bytemap array to the right and subtracting the third bytemap array from the second bytemap array, resulting in values corresponding to the run representation.

In some embodiments, the entries in the look up table are of 8 bytes size, the lower part values are right aligned, the upper part values are left aligned, and bytes not occupied by the lower part and upper part values are stuffed with –1's.

In some embodiments, steps in the method are executed by SIMD instructions.

The embodiments herein also discloses a coding or decoding device adjusted to calculate run and/or level representations of respective quantized transform coefficients representing pixel values in a block of a video picture inserted in a coefficient array, comprising means for generating a bitmask array inserting "1" in corresponding positions of nonzero coefficients in the coefficient array and "0" in corresponding positions of zero coefficients in the coefficient array, means for respectively performing a look up of the 8 least significant bits and the 8 most significant bits of the bitmask in a look up table mapping all possible 8 bits bitmap values to corresponding lower part and upper part bytemap values, means for patching the looked up 8 bytes lower part and upper part bytemap values in a first bytemap array, and means for inserting the bytes of the first bytemap array from index position 8 minus the number of non-zeros in the 8 least significant bits of the bitmask in a second bytemap array.

In some embodiments, the coding or decoding device also comprises means for determining the level representation by reading consecutive bytes from the coefficient arrays being indexed by values of the second bytemap array.

In some embodiments, the coding or decoding device also comprises means for creating a copy of the second bytemap array in a third bytemap array, means for adding +1 to each value of the third bytemap array, means for shifting the values of the third bytemap array to the right, means for subtracting the third bytemap array from the second bytemap array, resulting in values corresponding to the run representation.

In some embodiments of the coding or decoding device, the entries in the look up table are of 8 bytes size, the lower part values are right aligned, the upper part values are left aligned, and bytes not occupied by the lower part and upper part values are stuffed with –1's.

In some embodiments of the coding or decoding device, the means are implemented by SIMD instructions.

BRIEF DESCRIPTION OF THE DRAWINGS

FIG. 4A-4F is a table disclosing a look-up table being used in one embodiment according to the present invention.

DETAILED DESCRIPTION OF THE INVENTION

Figure 1:
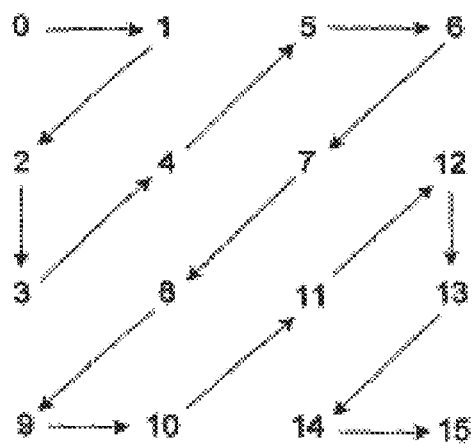
FIG. 1 shows a zigzag pattern indicating the coefficient order of a coefficient array within a block.
Figure 2:
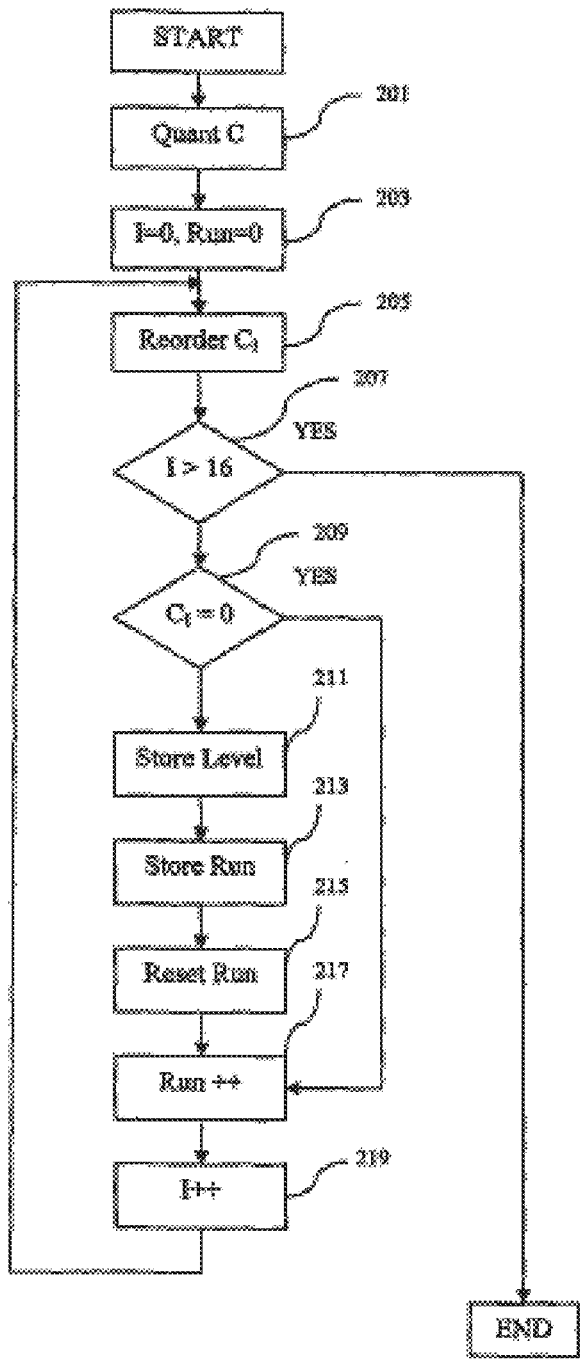
FIG. 2 shows a flow chart illustrating how the run-level code is calculated in a conventional implementation.

FIG. 2 is a flow chart illustrating how the run-level code, according to Moving Picture Experts Group (MPEG-4) and H.264, is calculated in a conventional implementation. After quantizing the transform coefficients (Quant C) 201 in a block, the Run variable and the position index (I) are set to zero 203. Then, the quantized coefficients are reordered 205 to a one-dimensional array according to the aforementioned zigzag pattern 100 shown in FIG. 1. The process then enters into a loop for parsing the array to determine the run-level values. First, it is checked whether—the number of positions in the array is exceeded (i.e., I>16) 207. If not, it is then checked whether current position in the array contains a zero 209. If so, both the Run variable and the position index (I) are incremented, at steps 217 and 219, and the process proceeds to the start of the loop. If the current position contains a non-zero value, the current Run variable and the value of the current position are stored as the Run-Level value, at steps 211 and 213. The Run variable is then reset 215, before both the Run variable and the position index (I) are incremented, at steps 217 and 219, and the process proceeds to the start of the loop. The process ends whenever the position index (I) exceeds the maximum size of the array, which, in the example illustrated in FIG. 2, is 16.

As can be seen from the conventional implementation illustrated in FIG. 2, the process always has to run through the run-level encoding loop as many times as there are positions in the array (i.e., 16 times in the example of FIG. 2). This becomes very inefficient as most coefficients in C are zero, and it is computationally expensive to loop over all coefficients and check whether they are non-zero.

According to embodiments disclosed herein, a simple and computationally cheap method where all nonzero coefficients quickly are determined simultaneously using table lookup and SIMD (Single Instructions, Multiple Data).

In the following discussion, the same example of sequence of coefficients of a 4×4 block that has been quantized and reordered according to the standard as the one used in the above background section will be used, inserted in the following one dimensional coefficient array:

| coefficients | 7 | –3 | 0 | 0 | 0 | 0 | 3 | –1 | 2 | –1 | 0 | 0 | 0 | 1 | 0 | 1 |
|---|---|---|---|---|---|---|---|---|---|---|---|---|---|---|---|---|

As already indicated, it is required to calculate level and run, where "level" simply are the nonzero coefficients stored sequentially, and "run" are the distance between two subsequent coefficients according to their original location The result to be achieved is therefore as follows:

| level | 7 | −3 | 3 | −1 | 2 | −1 | 1 | 1 |
|---|---|---|---|---|---|---|---|---|
| run | 0 | 0 | 4 | 0 | 0 | 0 | 3 | 1 |

In order to achieve this result, a so-called bit mask is generated where "1" denotes a nonzero coefficient and "0" denotes a coefficient that is zero.

| coefficients | 7 | −3 | 0 | 0 | 0 | 0 | 3 | −1 | 2 | −1 | 0 | 0 | 0 | 1 | 0 | 1 |
|---|---|---|---|---|---|---|---|---|---|---|---|---|---|---|---|---|
| bitmask | 1 | 1 | 0 | 0 | 0 | 0 | 1 | 1 | 1 | 1 | 0 | 0 | 0 | 1 | 0 | 1 |

Note that in the bit mask above, the leftmost bit is the least significant bit, and is therefore indexed 0. This will implicitly be taken into account in the further description, e.g. when referring to "lower" and "upper".

As run and level normally are calculated manually in an inefficient loop that iterates over the coefficients sequentially the inventor instead proposes, based on the bitmask, to generate a compact so-called bytemap that denotes the position of the nonzero coefficients, as follows:

| Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| coefficients | 7 | −3 | 0 | 0 | 0 | 0 | 3 | −1 | 2 | −1 | 0 | 0 | 0 | 1 | 0 | 1 |
| Bytemap | 0 | 1 | 6 | 7 | 8 | 9 | 13 | 15 | | | | | | | | |

As can be seen, the byte map specifies the respective bit positions of the non-zero coefficients in the sequence of coefficients.

Apparently, there is one unique bytemap for each possible bitmask pattern. The inventor therefore further proposes to map bytemaps to corresponding bitmasks in a lookup table. However, since one table would be too large for practical purposes as it would contain 256 elements of 16 bytes, altogether 1 MB, two tables are used where one table represents a lower part of the bytemap, and another table represents an upper part, each with 256 elements of 8 bytes, altogether only 4 KB. The mapping of the bytemap and bitmask of the example above will be as follows:

Upper part:
Dec: 8,9,13,15 Hex:08090d0f=>Dec:163 Bin:10100011
Lower part:
Dec: 0,1,6,7 Hex: 00010607=>Dec:195 Bin:11000011

Note that the binary numbers above are flipped compared with the illustrated bitmask, due to the fact that the least significant bit is indexed 0 (as earlier mentioned).

The two tables are further merged together so that bytemaps of the lower and the upper part corresponding to the same lower and upper part bitmap value are aligned. Such a merged table is illustrated in FIG. 4A-4F. Here, all possible hexadecimal representations of the upper and lower part of the bytemaps are placed side by side together with the corresponding decimal representation of the bitmap. Also note that the elements in the lower table are right aligned and the elements in the upper table are left aligned, the reason of which will be apparent in the later discussion. Also note that the redundant bytes are stuffed with the hexadecimal ff, which in the following also may be referred to as −1.

In the above example, a look up of the lower 8-bits "11000011"=195 in the table returns,

| −1 | −1 | −1 | −1 | 0 | 1 | 6 | 7 |
|---|---|---|---|---|---|---|---|

Stuff bytes are set to "−1" intentionally.

A look up of the upper 8-bits "11000101"=163 in the table returns,

| 8 | 9 | 13 | 15 | −1 | −1 | −1 | −1 |
|---|---|---|---|---|---|---|---|

These two are then patched together resulting in,

| −1 | −1 | −1 | −1 | 0 | 1 | 6 | 7 | 8 | 9 | 13 | 15 | −1 | −1 | −1 | −1 |
|---|---|---|---|---|---|---|---|---|---|---|---|---|---|---|---|

This 16 byte array is then stored in a 24 byte buffer in a manner that always ensures that element 8 happens to be the starting position of the bytemap. Thus, it is proposed to calculate the number of bits set (equal to 1) in the upper 8-bits part of the mask, e.g. using the SIMD instruction POPCNT and store the 16 byte vector at this offset. In the example, there are 4 bits set in the upper part of the mask, and the result becomes:

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| C | C | C | C | −1 | −1 | −1 | −1 | 0 | 1 | 6 | 7 | 8 | 9 | 13 | 15 | −1 | −1 | −1 | −1 | C | C | C | C |

Here, C denotes uninitialized bytes. Then, the 16 bytes from position 8 is read as follows:

| 23 | 22 | 21 | 20 | 19 | 18 | 17 | 16 | 15 | 14 | 13 | 12 | 11 | 10 | 9 | 8 |
|----|----|----|----|----|----|----|----|----|----|----|----|----|----|---|---|
| C  | C  | C  | C  | −1 | −1 | −1 | −1 | 0  | 1  | 6  | 7  | 8  | 9  | 13 | 15 |

The level values are then obtained in a single step by e.g. calling the SIMD instruction PSHUFB, with the coefficients and the bytemap as the argument, giving the following result:

| coefficients | 7 | −3 | 0 | 0 | 0 | 0 | 3 | −1 | 2 | −1 | 0 | 0 | 0 | 1 | 0 | 1 |
|---|---|---|---|---|---|---|---|---|---|---|---|---|---|---|---|---|
| bytemap | C | C | C | C | −1 | −1 | −1 | −1 | 0 | 1 | 6 | 7 | 8 | 9 | 13 | 15 |
| PSHUFB |   |   |   |   |   |   |   |   | 7 | −3 | 3 | −1 | 2 | −1 | 1 | 1 |

Then, the run is calculated by subtracting the bytemap by the shifted bytemap +1 as follows. The reason stuff bytes are set to −1 is that the stuff values after shifting and adding +1 should be zero to obtain the correct run after subtraction.

| bytemap | C | C | C | C | −1 | −1 | −1 | −1 | 0 | 1 | 6 | 7 | 8 | 9 | 13 | 15 |
|---|---|---|---|---|---|---|---|---|---|---|---|---|---|---|---|---|
| PADDB 1 | C | C | C | C | C | 0 | 0 | 0 | 1 | 2 | 7 | 8 | 9 | 10 | 14 | 16 |
| PSLLDQ 1 | C | C | C | C | C | C | 0 | 0 | 0 | 1 | 2 | 7 | 8 | 9 | 10 | 14 |
| PSUBUSB | C | C | C | C | C | C | 0 | 0 | 0 | 0 | 4 | 0 | 0 | 0 | 3 | 1 |

Finally, the number of nonzero bytes of the entire bitmask is calculated e.g. by using the SIMD instruction POPCNT. In this example, POPCNT returns 8 and the result, as desired, the final result becomes:

| level | 7 | −3 | 3 |   | −1 | 2 |   | −1 | 1 | 1 |
|---|---|---|---|---|---|---|---|---|---|---|
| run | 0 |   | 0 | 4 | 0 | 0 |   | 0 | 3 | 1 |

Figure 3:
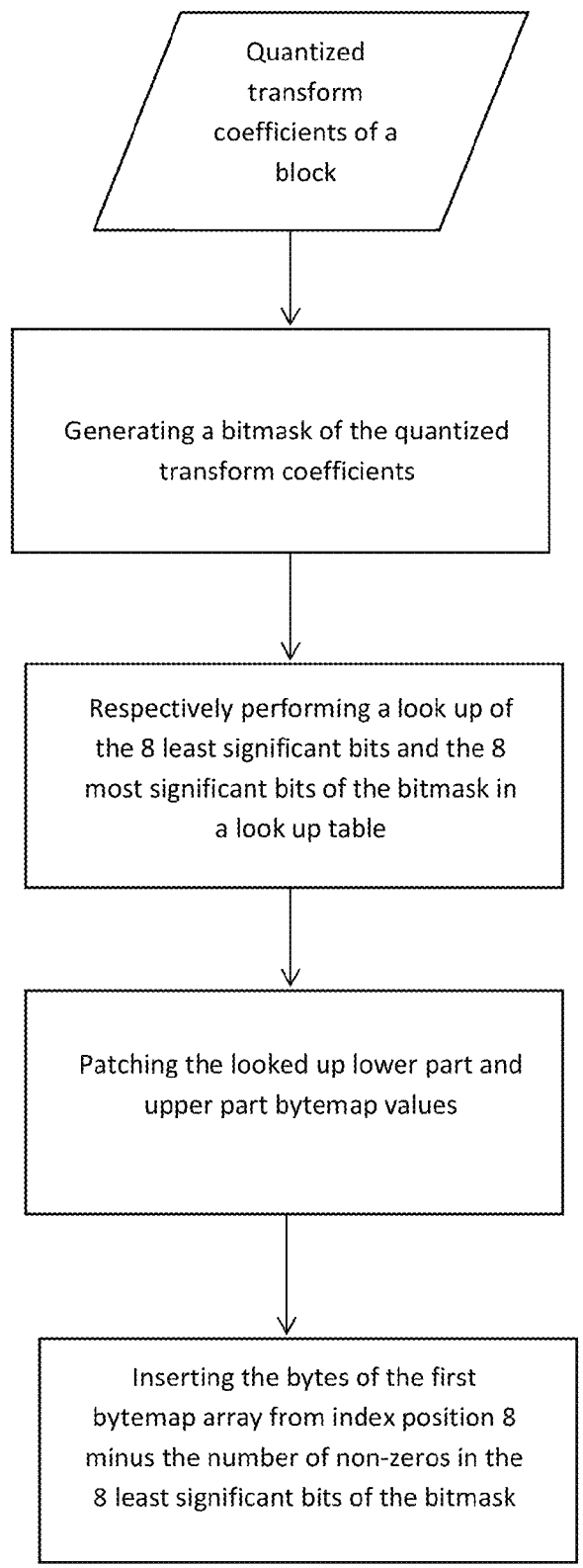
FIG. 3 is a flow chart illustrating the main steps of an embodiment according to the present invention.

The main elements of the embodiment discussed above is illustrated in the flow chart of FIG. 3.

As already indicated, the embodiment described above may advantageously be implemented by SIMD instructions in a SIMD processor environment. In the following, the example above will be described by referring to a concrete executable SIMD instruction set. The functions used are commonly known functions for persons skilled in the art. The instruction set is highlighted in italics, and are merged with the explanation of the different parts of the instruction set.

```
#include "magic.h"
#include <stdio.h>
#include <nmmintrin.h>
#define O _mm_setzero_si128( )
#define v(x) *(___m128i*)(x)
int main( )
    {
    int i;
    char buffer[24];
    char bytemap[16];
    char level[16];
    char run[16];
    char shiftmap[16];
```

The 16 coefficients in a 4×4 block are stored sequentially in a 16 byte array. In the example the coefficients are set to:
    char coeffs[16]={7,−3,0,0,0,0,3,−1,2,−1,0,0,0,1,0,1};
First, a bitmask that denotes which coefficients are not zero must be determined unsigned short bitmask=~_mm_movemask_epi8(_mm_cmpeq_epi8(v(&coeffs),O));

Note that this bitmask would be expected to be:

$\{1, 1, 0, 0, 0, 0, 1, 1, 1, 1, 0, 0, 0, 1, 0, 1\}$

However, the bitmask would actually be the reverse of this, as the least significant bit corresponds to index zero:

$\{1, 0, 1, 0, 0, 0, 1, 1, 1, 1, 0, 0, 0, 0, 1, 1\}$

This bitmask can actually be regarded as a number, and each such number uniquely describes which of the 16 coefficients that are nonzero. To avoid too many entries in the lookup table, this number is split into a lower and upper part in the following manner:
    unsigned char bitmask_lo=bitmask&0xff;
    unsigned char bitmask_hi=bitmask>>0x8;
    The result of this operation is
lower mask $\{1, 1, 0, 0, 0, 0, 1, 1\}$
upper mask $\{1, 0, 1, 0, 0, 0, 1, 1\}$
These two numbers are 8-bits each, and 8-bits integers are in the range from 0 to 255. In the example, the two numbers are:
lower mask 195
upper mask 163
    With these two numbers, a lookup in the bytemap table will identify the corresponding bytemaps.
    At location 195 on the left part of the bytemap table the hexadecimal number 0xffffffff00010607 can be found, and at location 163 on the right part of the bytemap table the hexadecimal number 0x08090d0fffffffff can be found. Hence,
    long long bytemap_lo=magic[bitmask_lo][0];
results in ff ff ff ff 00 01 06 07, and
    long long bytemap_hi=magic[bitmask_hi][1];
results in 08 09 0d 0f ff ff ff ff.
    The numbers above are written in hexadecimal format, and if the corresponding decimal numbers are:
lower bytemap $\{-1,-1,-1,-1, 0, 1, 6, 7\}$
upper bytemap $\{8, 9, 13, 15, -1, -1, -1, -1\}$
    It is not a coincidence that the "unused" bytes are set to −1, as this may help us to achieve the correct run values later. The two bytemaps now need to be patched to obtain a single bytemap.
    The most naive way to do this, would lead to:
bytemap $\{-1,-1,-1,-1, 0, 1, 6, 7, 8, 9, 13, 15, -1, -1, -1, -1\}$
    This, however, would not be so easy to use, as the bytes, from which run and level are to be calculated are stored in the middle of the array, at location 4 to 12.

The "unused" bytes at each side of the table must therefore be eliminated. To do this, the bytemap must be shifted as a function of the number of nonzero bytes. In the following, X denotes the locations in the upper bytemap which is nonzero, and Y denotes the locations in the lower bytemap
shift=0 {Y, Y, Y, Y, Y, Y, Y, Y, X, X, X, X, X, X, X, X}
shift=1 {Y, Y, Y, Y, Y, Y, Y, Y, X, X, X, X, X, X, X,−1}
shift=2 {Y, Y, Y, Y, Y, Y, Y, Y, X, X, X, X, X, X,−1,−1}
shift=3 {Y, Y, Y, Y, Y, Y, Y, Y, X, X, X, X, X,−1,−1,−1}
shift=4 {Y, Y, Y, Y, Y, Y, Y, Y, X, X, X, X,−1,−1,−1,−1}
shift=5 {Y, Y, Y, Y, Y, Y, Y, Y, X, X, X,−1,−1,−1,−1,−1}
shift=6 {Y, Y, Y, Y, Y, Y, Y, Y, X, X,−1,−1,−1,−1,−1,−1}
shift=7 {Y, Y, Y, Y, Y, Y, Y, Y, X,−1,−1,−1,−1,−1,−1,−1}
shift=8 {Y, Y, Y, Y, Y, Y, Y, Y,−1,−1,−1,−1,−1,−1,−1,−1}

Thus, if all the bytes in the upper bytemap are unused "4", it will be necessary to shift the bytemap by 8, which would mean that the first byte in the resulting bytemap would be the first byte in the lower bytemap. In order to achieve this, the bytemap may simply be shifted with the number of bits set in the upper bitmask. One way to achieve this would be to first count the number of nonzero bits in the upper bitmask:

int nonzero_hi=_mm_popcnt_u32(bitmask_hi);

If the patched bytemap is stored in a buffer at the location which is equal to the number of bits set in the upper bitmask, the following will be obtained for all possible combinations:
Position: 23,22,21,20,19,18,17,16,15,14,13,12,11,10,9, 8, 7, 6, 5, 4, 3, 2, 1, 0
nonzero_hi=8 {Y,Y,Y,Y,Y,Y,Y,Y, X, X, X, X, X, X, X, X, C, C, C, C, C, C, C, C}
nonzero_hi=7 {C,Y,Y,Y,Y,Y,Y,Y,Y, X, X, X, X, X, X, X,−1, C, C, C, C, C, C, C}
nonzero_hi=6 {C, C, Y, Y, Y, Y, Y, Y, Y, X, X, X, X, X, X,−1,−1, C, C, C, C, C, C}
nonzero_hi=5 {C, C, C, Y, Y, Y, Y, Y, Y, Y, X, X, X, X, X,−1,−1,−1, C, C, C, C, C}
nonzero_hi=4 {C, C, C, C, Y, Y, Y, Y, Y, Y, Y, X, X, X, X,−1,−1,−1,−1, C, C, C, C}
nonzero_hi=3 {C, C, C, C, C, Y, Y, Y, Y, Y, Y, Y, X, X, X,−1,−1,−1,−1,−1, C, C, C}
nonzero_hi=2 {C, C, C, C, C, C, Y, Y, Y, Y, Y, Y, Y, X, X, X,−1,−1,−1,−1,−1,−1, C, C}
nonzero_hi=1 {C, C, C, C, C, C, C, Y, Y, Y, Y, Y, Y, Y, X,−1,−1,−1,−1,−1,−1,−1, C}
nonzero_hi=0 {C, C, C, C, C, C, C, C, C, Y, Y, Y, Y, Y, Y, Y, Y,−1,−1,−1,−1,−1,−1,−1,−1}
where C denotes uninitialized bytes.
v(&buffer[nonzero_hi])=_mm_set_epi64×(bytemap_lo, bytemap_hi);

Then the bytes from location 8 in this buffer are read obtaining, in the example case:
{cc, cc, cc, cc, ff, ff, ff, ff, 00, 01, 06, 07, 08, 09, 0d, 0f}

The nonzero bytemap written in decimal form then becomes
{0, 1, 6, 7, 8, 9, 13, 15}
v(&bytemap)=v(&buffer[8]);

The level values may now be calculated by simply using a table lookup function on the coefficients with the last mentioned bytemap array as argument to obtain:
{1, 1,−1, 2,−1, 3,−3, 7}
v(&level)=_mm_shuffle_epi8(v(&coeffs),v(&bytemap));

However, to calculate the run values, the bytemap must first be shift and add by 1 to obtain a "shiftmap"
Bytemap {C, C, C, C,−1,−1,−1,−1, 0, 1, 6, 7, 8, 9,13,15}
shift right by 1 {C,C,C,C,C,−1,−1,−1,−1, 0, 1, 6, 7, 8, 9,13}
shiftmap=add 1 {C, C, C, C, C, 0, 0, 0, 0, 1, 2, 7, 8, 9,10,14}
v(&shiftmap)=_mm_srli_si128(_mm_add_epi8(v (&bytemap),_mm_set1_epi8(1)),1);

Then the run values will be obtained by subtracting the shiftmap from the bitmap:
shiftmap−bytemap {C, C, C, C, C,−1,−1,−1, 0, 0, 4, 0, 0, 0, 3, 1}
v(&run)=_mm_subs_epu8(v(&bytemap),v(&shiftmap));

Then both the run and level are obtained. To complete the instruction set, instructions for displaying run/level to a screen is disclosed below.

```
int nonzero = _mm_popcnt_u32(bitmask);
for(i=0;i<nonzero;i++)
{
printf("%4d", level[i]);
printf("\n");
for(i=0;i<nonzero;i++)
{
printf("%4d", run[i]);
}
printf("\n");
return(0);
}
```

The main advantage of the present invention is that run and level can be quickly determined using a simple table lookup and efficient vector instructions, as opposed to the various conventional methods that manually iterates over the coefficients one at a time. Treating the level values as signed bytes is an approximation, and a fallback method has to be implemented in the case in which two bytes is required to represent the level. While the fallback method is considerably slower, investigations have revealed that this represents a negligible overhead as the signed byte approximation is valid more than 99% of time.

What is claimed is:

1. A method in a video coding or decoding process performed in a computer device for calculating at least one of run and level representations of respective quantized transform coefficients representing pixel values in a block of a video picture inserted in a coefficient array, the method comprising the steps of:
generating a bitmask array inserting "1" in corresponding positions of nonzero coefficients in the coefficient array and "0" in corresponding positions of zero coefficients in the coefficient array;
performing a look up of the 8 least significant bits and the 8 most significant bits of the bitmask in a look up table mapping all possible 8 bits bitmap values to corresponding lower part and upper part bytemap values;
patching the looked up lower part and upper part bytemap values in a first bytemap array; and
inserting the bytes of the first bytemap array from index position 8 minus the number of non-zeros in the 8 least significant bits of the bitmask in a second bytemap array.

2. The method according to claim 1, further comprising the following step:
determining the level representation by reading consecutive bytes from the coefficient arrays being indexed by values of the second bytemap array.

3. The method according to claim 1, further comprising the following steps:
creating a copy of the second bytemap array in a third bytemap array, adding +1 to each value of the third bytemap array;
shifting the values of the third bytemap array to the right; and
subtracting the third bytemap array from the second bytemap array, resulting in values corresponding to the run representation.

4. The method according to claim 1, wherein the entries in the look up table are of 8 bytes size, the lower part values are right aligned, the upper part values are left aligned, and bytes not occupied by the lower part and upper part values are stuffed with −1's.

5. The method according to claim 1, wherein the steps are executed by Single Instructions, Multiple Data (SIMD) instructions.

6. A device for one of coding and decoding that is adjusted to calculate at least one of run and level representations of respective quantized transform coefficients representing pixel values in a block of a video picture inserted in a coefficient array, the device comprising:

means for generating a bitmask array inserting "1" in corresponding positions of nonzero coefficients in the coefficient array and "0" in corresponding positions of zero coefficients in the coefficient array;

means for respectively performing a look up of the 8 least significant bits and the 8 most significant bits of the bitmask in a look up table mapping all possible 8 bits bitmap values to corresponding lower part and upper part bytemap values;

means for patching the looked up 8 bytes lower part and upper part bytemap values in a first bytemap array; and means for inserting the bytes of the first bytemap array from index position 8 minus the number of non-zeros in the 8 least significant bits of the bitmask in a second bytemap array.

7. The device according to claim 6, further comprising means for determining the level representation by reading consecutive bytes from the coefficient arrays being indexed by values of the second bytemap array.

8. The device according to claim 6, further comprising:

means for creating a copy of the second bytemap array in a third bytemap array;

means for adding +1 to each value of the third bytemap array;

means for shifting the values of the third bytemap array to the right; and means for subtracting the third bytemap array from the second bytemap array, resulting in values corresponding to the run representation.

9. The device according to claim 6, wherein the entries in the look up table are of 8 bytes size, the lower part values are right aligned, the upper part values are left aligned, and bytes not occupied by the lower part and upper part values are stuffed with −1's.

10. The device according to claim 6, wherein the means are implemented by Single Instructions, Multiple Data (SIMD) instructions.

* * * * *